(12) United States Patent
Cho et al.

(10) Patent No.: US 10,893,542 B2
(45) Date of Patent: Jan. 12, 2021

(54) RANDOM ACCESS METHOD IN BDMA SYSTEM AND RANDOM ACCESS METHOD IN PATTERN/POLARIZED BDMA SYSTEM

(71) Applicant: KOREA ADVANCED INSTITUTE OF SCIENCE AND TECHNOLOGY, Daejeon (KR)

(72) Inventors: Dong Ho Cho, Daejeon (KR); Byung Chang Chung, Daejeon (KR); Dae Hee Park, Daejeon (KR); Joon Sang Han, Daejeon (KR); Yun Sik Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 221 days.

(21) Appl. No.: 16/078,229

(22) PCT Filed: Feb. 22, 2016

(86) PCT No.: PCT/KR2016/001697
§ 371 (c)(1),
(2) Date: Aug. 21, 2018

(87) PCT Pub. No.: WO2017/146274
PCT Pub. Date: Aug. 31, 2017

(65) Prior Publication Data
US 2019/0053286 A1   Feb. 14, 2019

(51) Int. Cl.
*H04B 7/04* (2017.01)
*H04B 7/0408* (2017.01)
(Continued)

(52) U.S. Cl.
CPC .......... *H04W 74/0833* (2013.01); *H04B 7/04* (2013.01); *H04B 7/0408* (2013.01);
(Continued)

(58) Field of Classification Search
CPC .......... H04B 7/04; H04B 7/0408; H04B 7/06; H04W 74/0833; H04W 4/029; H04W 74/08
See application file for complete search history.

(56) References Cited

U.S. PATENT DOCUMENTS

2013/0177102 A1   7/2013   Park
2015/0133173 A1*  5/2015   Edge .................... G01S 1/66
                                                     455/456.6
(Continued)

FOREIGN PATENT DOCUMENTS

WO   WO 2009/116819 A2   9/2009
WO   WO 2012/091342 A2   7/2012
(Continued)

*Primary Examiner* — Edan Orgad
*Assistant Examiner* — Emmanuel K Maglo
(74) *Attorney, Agent, or Firm* — Paratus Law Group, PLLC

(57) ABSTRACT

A random access method in a beam division multiple access (BDMA) system including: receiving, by a terminal, a reference signal of at least one beam sector transmitted from an access point (AP) device; estimating, by the terminal, whether the terminal is in a center area of the beam sector provided by the AP device or in the boundary area of the beam sector by using the strength of the reference signal; transmitting, by the terminal, a different preamble to the AP device in accordance with location information of whether the terminal is located in the center area or in the boundary area; and determining, by the AP device, a target beam sector for transmitting information about uplink resources to be used by the terminal, among a plurality of beam sectors on the basis of the received preamble.

16 Claims, 11 Drawing Sheets

(51) Int. Cl.
*H04W 74/08* (2009.01)
*H04B 7/06* (2006.01)
*H04W 4/029* (2018.01)

(52) U.S. Cl.
CPC ............... *H04B 7/06* (2013.01); *H04B 7/063* (2013.01); *H04B 7/0617* (2013.01); *H04B 7/0695* (2013.01); *H04W 4/029* (2018.02)

(56) References Cited

U.S. PATENT DOCUMENTS

2016/0219571 A1* 7/2016 Lin .................... H04W 72/0473
2017/0257780 A1* 9/2017 Ryoo .................... H04B 7/0617
2019/0104549 A1* 4/2019 Deng .................... H04B 7/0617

FOREIGN PATENT DOCUMENTS

WO    WO 2014/051405 A2    4/2014
WO    WO 2015/030520 A1    3/2015

\* cited by examiner

FIG.7
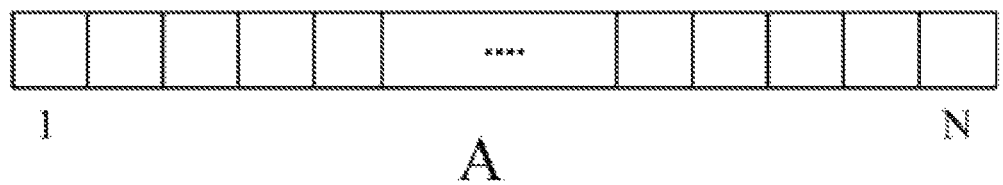
A
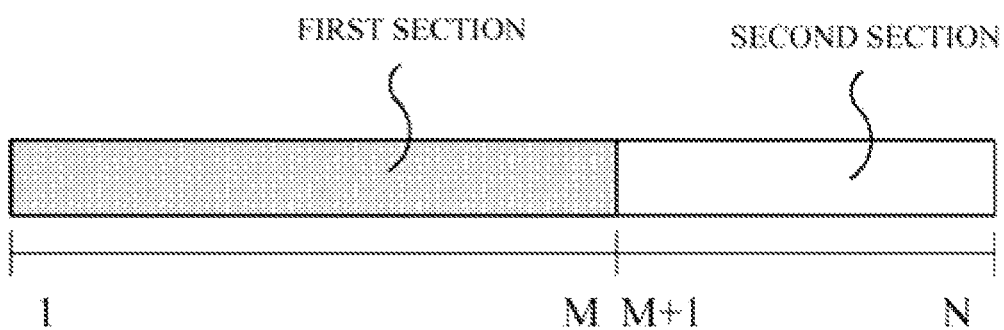
B
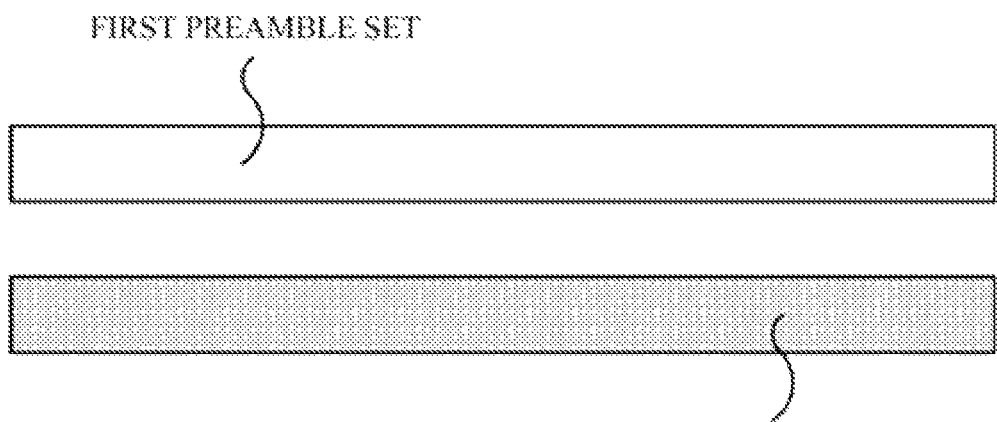
C

FIG.11
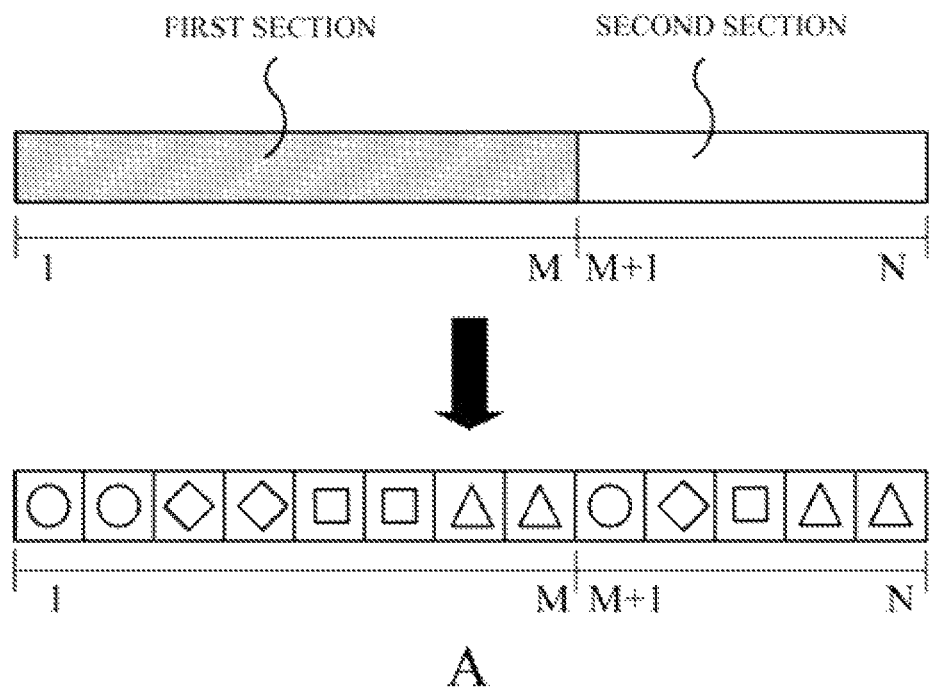
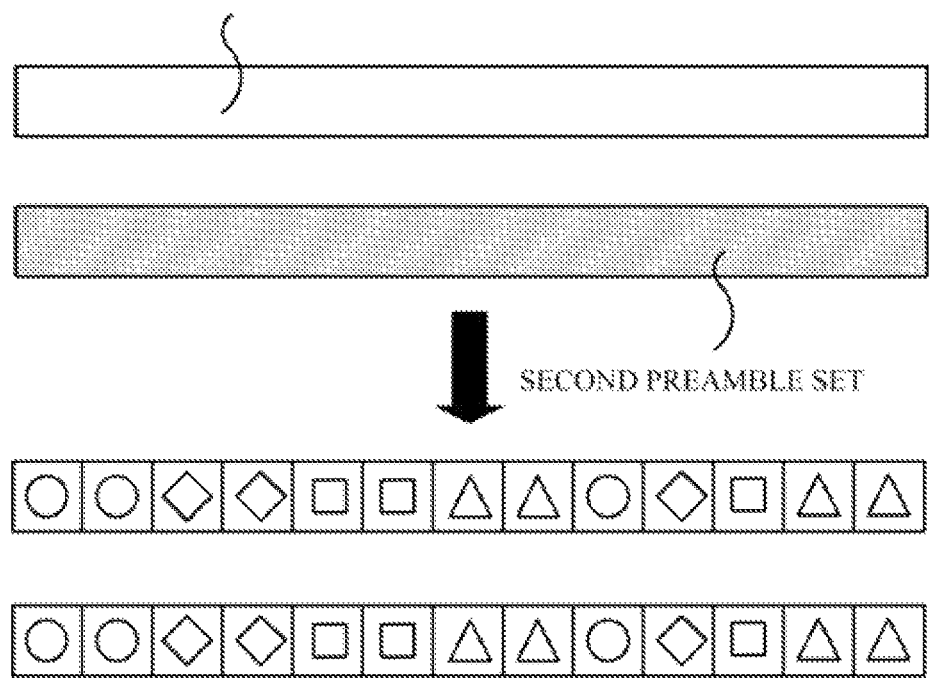

RANDOM ACCESS METHOD IN BDMA SYSTEM AND RANDOM ACCESS METHOD IN PATTERN/POLARIZED BDMA SYSTEM

CROSS REFERENCE TO PRIOR APPLICATION

This application is a National Stage Patent Application of PCT International Patent Application No. PCT/KR2016/001697 filed on Feb. 22, 2016 under 35 U.S.C. § 371, which is all hereby incorporated by reference in its entirety.

TECHNICAL FIELD

The following description relates a random access method in a beam division multiple access (BDMA) system and a random access method in a pattern/polarized BDMA system.

BACKGROUND ART

Traffic for high-speed data communication in a wireless or mobile communication system has been rapidly increased. And a beam division multiple access (BDMA) system has been researched for a next generation communication system.

In massive multi-input multi-output (massive MIMO) technology for next generation communication technology, a large number of antennas are required as 32, 64, 128 or etc. The space for the large number of antennas may become a problem. In order to solve such a problem, antennas utilizing pattern/polarization characteristics have been proposed.

DISCLOSURE

Technical Problem

The following description is directed to a random access method in a beam division multiple access (BDMA) system. In addition, The following description is also directed to a random access method in a pattern/polarized BDMA system.

Technical Solution

In one general aspect, there is provided a random access method in a beam division multiple access (BDMA) system, including steps of receiving, by a terminal, a reference signal of at least one beam sector transmitted from an access point (AP) device, estimating, by the terminal, whether the terminal is in a center area of the beam sector provided by the AP device or in the boundary area of the beam sector by using the strength of the reference signal, transmitting, by the terminal, a different preamble to the AP device in accordance with location information of whether the terminal is located in the center area or in the boundary area, and determining, by the AP device, a target beam sector for transmitting information about uplink resources to be used by the terminal, among a plurality of beam sectors on the basis of the received preamble.

In another general aspect, there is provided a random access method in a pattern/polarized BDMA system, including steps of receiving, by a terminal, a reference signal of at least one beam sector transmitted from an access point (AP) device which uses a pattern/polarized antenna, determining, by the terminal, an antenna array whose signal is the strongest among a plurality of pattern/polarized antenna arrays providing the beam sector, transmitting, by the terminal, a preamble which corresponds to a type of the antenna array having the strongest signal to the AP device, and estimating, by the AP device, a delay time of uplink on the basis of the preamble and transmitting information for compensating for the delay time to the terminal. The preamble may have a different value according to a type of the antenna array.

In yet another general aspect, there is provided a random access method in a pattern/polarized BDMA system, including steps of receiving, by a terminal, a reference signal of at least one beam sector transmitted from an access point (AP) device which uses a pattern/polarized antenna, estimating, by the terminal, whether the terminal is in a center area of the beam sector provided by the AP device or in the boundary area of the beam sector by using the strength of the reference signal, and transmitting, by the terminal, a preamble selected on the basis of at least one of location information of whether the terminal is located in the center area or the boundary area and a type of an antenna array having the strongest signal among a plurality of pattern/polarized antenna arrays providing the beam sector to the AP device.

Advantageous Effects

The following description excludes the redundancy of random access processing for terminals located at a boundary of a beam sector in a beam division multiple access (BDMA) system. Further, the technology described below provides random access with a low probability of collision by using pattern/polarization characteristics.

DESCRIPTION OF DRAWINGS

FIG. 7 illustrates an example of a preamble set.

FIG. 11 illustrates an example of selecting a preamble for a random access in a pattern/polarized BDMA system.

MODES OF THE INVENTION

Figure 1:
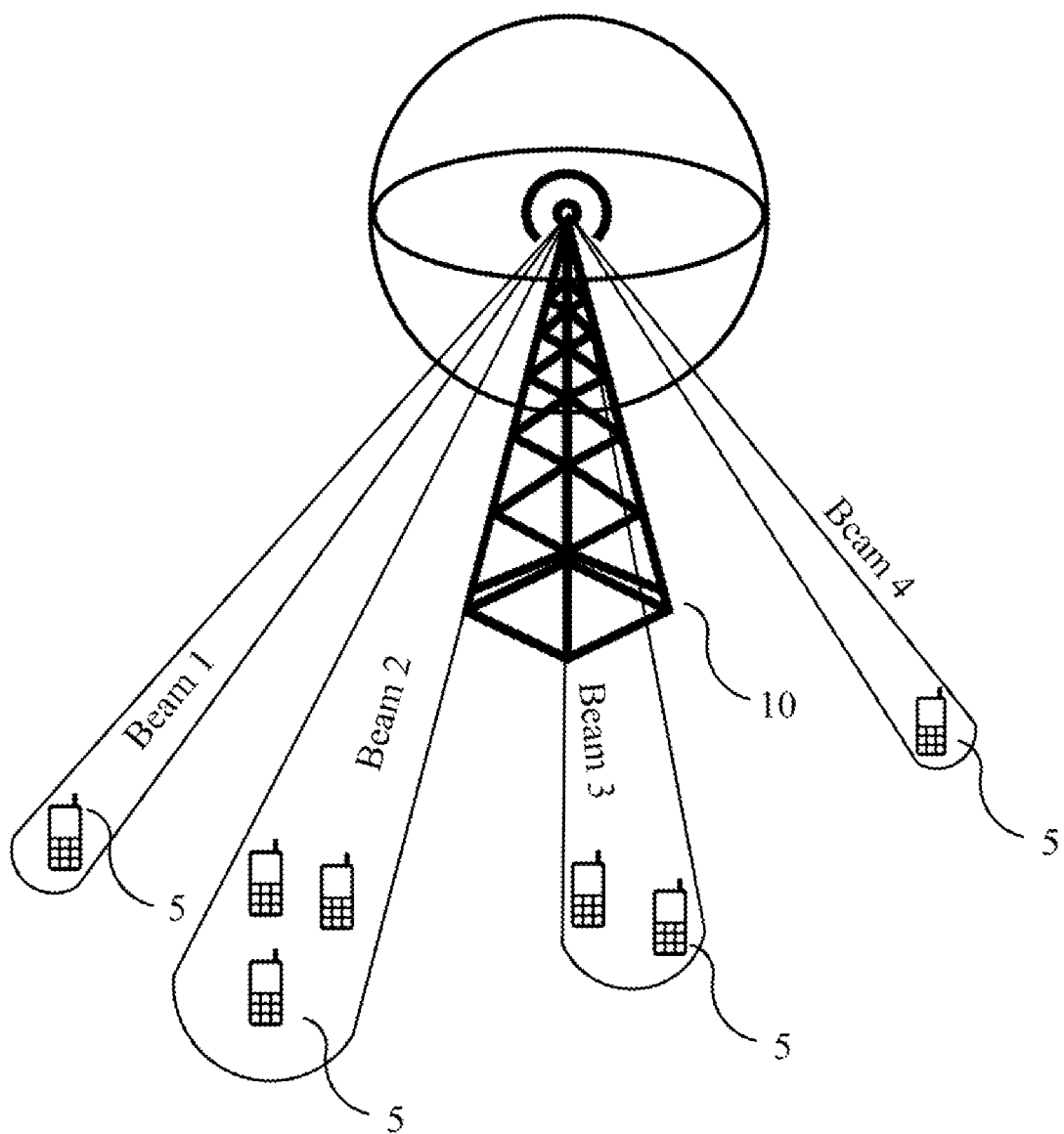
FIG. 1 illustrates an example of a beam division multiple access (BDMA) system.

The following description can be modified and changed in various ways and can be embodied in various forms, and thus, the following description will now be described in detail with reference to the accompanying drawings, in which exemplary embodiments of the invention are illustrated. However, it should be noted that the following description is not limited to the exemplary embodiments, but all modifications, equivalents, or substitutes within the spirit and scope will be construed as being included in the following description.

It will be understood that, although the terms "first", "second", "A", "B", and the like may be used herein in explaining various elements of the invention, such elements should not be limited by these terms, but are only used to distinguish one element from another. For example, a first element could be termed a second element, and similarly, a second element could be termed a first element, without departing from the scope of the following description. As used herein, the term "and/or" includes any and all combinations of one or more of the associated listed items.

As used herein, the singular forms are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before describing the drawings in detail, it should be noted that the distinction of elements is for distinguishing the main function of each element. That is, two or more elements to be described below can be combined into one element, or an element can be functionally divided into two or more elements. Moreover, each element to be described below can perform not only its main function but also some or all of the functions of other elements. Conversely, it is also possible that a part of the main functions pertaining to each element can be fully performed by other elements. Therefore, the presence of each element described in the present specification should be functionally interpreted.

In addition, in performing a method or an operational method, each process constituting the method may be performed in an order different from a specified order as long as a specific order is not explicitly and contextually specified. That is, each process may be performed in the same order as the specified order, performed substantially simultaneously, or performed in reverse order.

A technology described below relates to a random access method in a beam division multiple access (BDMA) system. The technology described below relates to a random access method in a BDMA system (hereinafter referred to as a "pattern/polarized BDMA system") using a pattern/polarized antenna. First, the BDMA system and the pattern/polarized BDMA system will be described in brief.

FIG. 1 illustrates an example of a BDMA system. The BDMA system refers to a wireless communication system based on BDMA technology. In the BDMA system, an access point (AP) device 10 transmits data simultaneously to a number of terminals 5 by transmitting beams to each of the terminals 5 at different angles (directions) (downlink). It is presumed that the AP device 10 knows positions of the terminals 5 in advance. The AP device 10 may use an antenna capable of changing a direction of a beam or beamforming in a predetermined area.

When the terminal 5 transmits data to a base station, the terminal 5 also transmits a beam to the AP device 10. One terminal does not exclusively use one dedicated beam but terminals positioned at similar angles share one beam to communicate with the base station. For example, in FIG. 1, beam 2 is a channel through which three terminals and the AP device 10 communicate. In this case, it is preferable that the terminals sharing one beam divide frequency/time resources to use.

The AP device 10 includes a device, such as a mobile communication base station. For example, the AP device 10 is a concept including a base station constituting a macro cell of mobile communication, an AP device constituting a small cell of mobile communication, an AP device of Wi-Fi, an AP device for short range communication, such as ZigBee, and the like. In the description below, the AP device 10 refers to a device that communicates with the terminal 5 using a particular communication scheme. The AP device 10 may act to connect a core network and the terminal 5.

The terminal 5 may include various devices which perform wireless communication through the AP device 10. For example, the terminal 5 may include a smartphone, a tablet PC, a notebook computer, a wearable device, and the like. The terminal 5 is basically carried by a user and thus has mobility. Alternatively, the terminal 5 may be attached to a mobile device (vehicle, or the like) and has mobility. Hereinafter, for convenience of description, it is assumed that the terminal 5 is a portable device, such as a smartphone, which is carried by a user.

Figure 2:
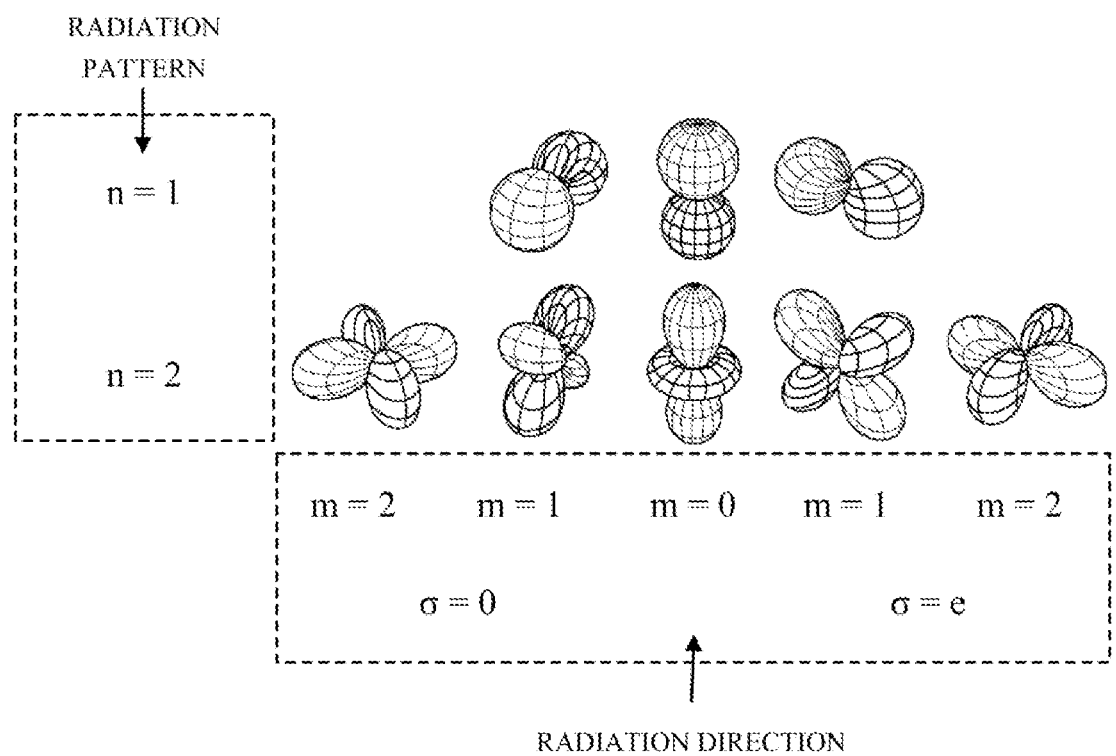
FIG. 2 illustrates an example of a radiation pattern using a pattern/polarized antenna.

FIG. 2 illustrates an example of a radiation pattern, using a pattern/polarized antenna. A pattern/polarized BDMA system uses a pattern/polarized antenna to communicate. The antenna may basically form a constant beam as described in FIG. 1. The antenna includes an antenna element. Further, the antenna element may exhibit a different characteristic according to a shape and material of the antenna element.

According to a characteristic of the antenna element, the antenna may have a specific shape of radiation pattern. FIG. 2 shows examples of radiation patterns of the antenna. FIG. 2 illustrates mainly two types of radiation patterns (n=1 and n=2). In addition, even radiation patterns of the same shape may be formed in different patterns according to a direction in which radiation is transmitted. FIG. 2 illustrates three different radiation patterns for a radiation pattern n=1 and five different radiation patterns for a radiation pattern n=2. Further, when a polarized antenna is used, different patterns may be provided according to directions in which an electric field and a magnetic field propagate.

When an AP device 10 transmits a signal using a unique radiation pattern (a first radiation pattern), a terminal 5 may receive a signal by distinguishing other radiation patterns from the first radiation pattern. That is, the radiation pattern becomes a kind of channel over which a signal is transmitted, independently of a beam.

Hereinafter, the term "pattern antenna" refers to an antenna device in which a plurality of antenna elements having a specific pattern are regularly arranged. The pattern antenna may include antenna elements having different patterns. In this case, the antenna element may be an element having a unique radiation pattern. Hereinafter, the term "polarized antenna" refers to an antenna device in which antenna elements having a specific polarization pattern are regularly arranged. The polarized antenna refers to an antenna that transmits signals which are distinguished from each other in an electric field region and a magnetic field region by simultaneously using both an electric field antenna and a magnetic field antenna, as described above. Hereinafter, the term "pattern/polarized antenna" refers to an antenna device that uses both a plurality of antenna elements having a specific pattern and antenna elements having a specific polarization pattern.

Figure 3:
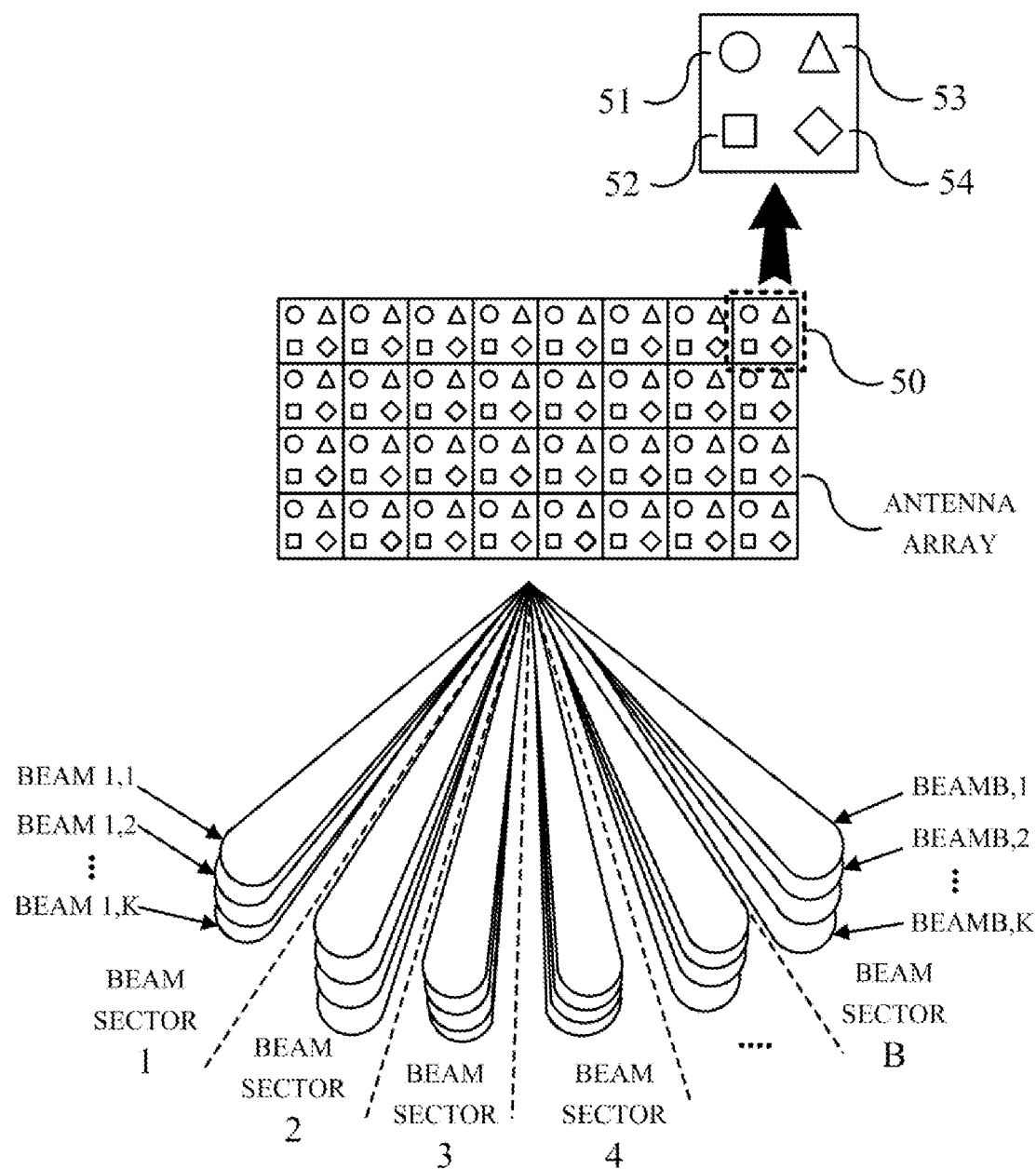
FIG. 3 illustrates an example of a concept of a pattern/polarized BDMA system.

FIG. 3 illustrates an example of a concept of a pattern/polarized BDMA system. The pattern/polarized BDMA system refers to a wireless communication system based on a pattern/polarized BDMA technology. In the upper portion of FIG. 3, an example of a pattern/polarized antenna is illustrated. As shown in FIG. 3, the pattern/polarized antenna may be an antenna array. That is, the pattern/polarized antenna may include a plurality of unit pattern/polarized antennas. An antenna array consisting of a plurality of pattern/polarized antennas is hereinafter referred to as a pattern/polarized antenna array. In FIG. 3, one unit pattern/polarized antenna 50 is indicated by a rectangular dotted line. One unit pattern/polarized antenna 50 includes a plurality of antennas 51, 52, 53, and 54. The plurality of antennas 51, 52, 53, and 54 have radiation patterns different from each other.

The pattern/polarized antenna arrays may each form B beam sectors through beamforming. The pattern/polarized antenna array may spatially separate beams into beam sectors using beamformers having unique weights for the respective sectors and transmit beams having the same angle of direction (AoD) using different pattern/polarized antennas. The pattern/polarized antenna array could simultaneously transmit signals of a plurality of beam sector characteristics in the respective beam sectors. Referring to FIG. 3, K different radiation patterns are simultaneously transmitted using K pattern/polarized antennas. That is, multiple-input multiple-output (MIMO) transmission is possible using the pattern/polarized antenna array. When the terminal 5 uses one antenna, multiple-input single-output (MISO) transmission is possible.

A BDMA system using a pattern/polarized antenna is referred to as a pattern/polarized BDMA system. In the pattern/polarized BDMA system, interference between multi-beam sector signals constituting the same beam sector is removed in advance using a precoder and then the signals are transmitted. The pattern/polarized BDMA system may simultaneously obtain a beamforming gain of a conventional BDMA scheme and a pattern polarized gain using a beam sector antenna.

A technology described herein relates to a random access method in a BDMA system and a pattern/polarized BDMA system. The technology described herein may be applied to a wireless communication system based on BDMA or pattern/polarized BDMA regardless of a communication scheme. However, for convenience of description, a part of a random access process in a mobile communication system will be described first.

Figure 4:
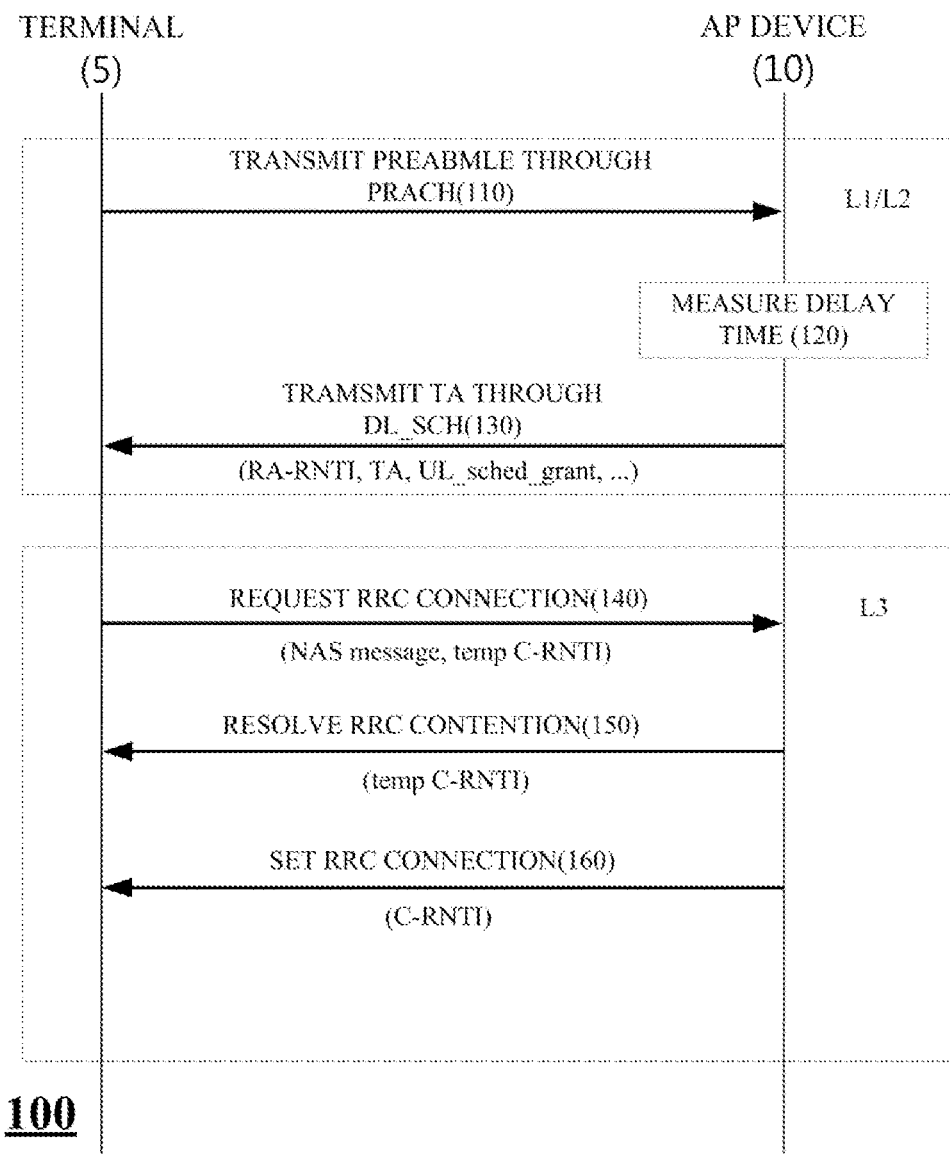
FIG. 4 illustrates an example of a random access process in mobile communication.

FIG. 4 illustrates an example of a random access process 100 in mobile communication. FIG. 4 shows an example of a random access process in a long term evolution (LTE) communication. First, a terminal 5 transmits a random access preamble to an AP device 10 so that the AP device 10 can estimate transmission timing of the terminal (110). The terminal 5 transmits the preamble through a physical random access channel (PRACH).

The terminal 5 selects one preamble to be transmitted over the PRACH. In the case of LTE, there are sixty-four available preamble sequences is in each cell. When random access is attempted, the terminal 5 may randomly select one preamble. As long as another terminal does not simultaneously use the same preamble, a collision may not occur and the AP device 10 may detect a normal random access attempt. The sixty-four random access preambles form one preamble sequence set. The preamble sequence set is composed of original ZC sequences or sequences that are cyclically shifted by a predetermined unit from the original ZC sequences.

In uplink synchronization, synchronization for uplink is required in order for the terminal 5 to transmit data in the uplink. By doing so, a random access attempt is informed to the AP device 10 which transmits a preamble and the AP device 10 may be allowed to estimate a delay between the terminal and the AP device 10. The AP device 10 estimates a delay time on the basis of a length of the received preamble (120).

The AP device 10 generates a timing advance (TA) instruction for controlling uplink timing on the basis of the delay time. Then, the AP device 10 transmits the TA instruction to the terminal 5 through a downlink shared channel (DL_SCH) in response to a request for random access (130). At this time, the AP device 10 transmits information (UL_sched_grant) about resources to be used by the terminal in uplink transmission. If the terminal 5 fails to detect a random access response within a time window, it is determined that the random access attempt has failed and all processes are repeated from the beginning. The preamble transmission (110) and the TA transmission (130) are performed through a L1/L2 layer.

The terminal 5 transmits an RRC connection request to the AP device 10 (140). In this process, the terminal 5 transmits its identity (temp C-RNTI) to a network. This process is performed using an uplink shared channel (UL-SCH) in a similar manner as in general data scheduling. The terminal 5 transmits a message through resources allowed by the AP device 10 as uplink resources.

The final step is a step of transmitting a contention-resolution message to the terminal from the network through the DL-SCH, and thereby, contention between a plurality of terminals attempting to access a system using the same random access resources is resolved. The AP device 10 transmits temp C-RNTI to the terminal 5 for RRC contention resolution (150).

The terminal 5 compares an identity temp C-RNTI in the message with the identity temp C-RNTI transmitted when the terminal 5 transmits the RRC connection request, and when the two identities are the same, the terminal 5 declares that the random access process is successful. The AP device 50 transmits a new identity C-RNTI to the terminal 5, and thereby an RRC connection is established (160).

Figure 5:
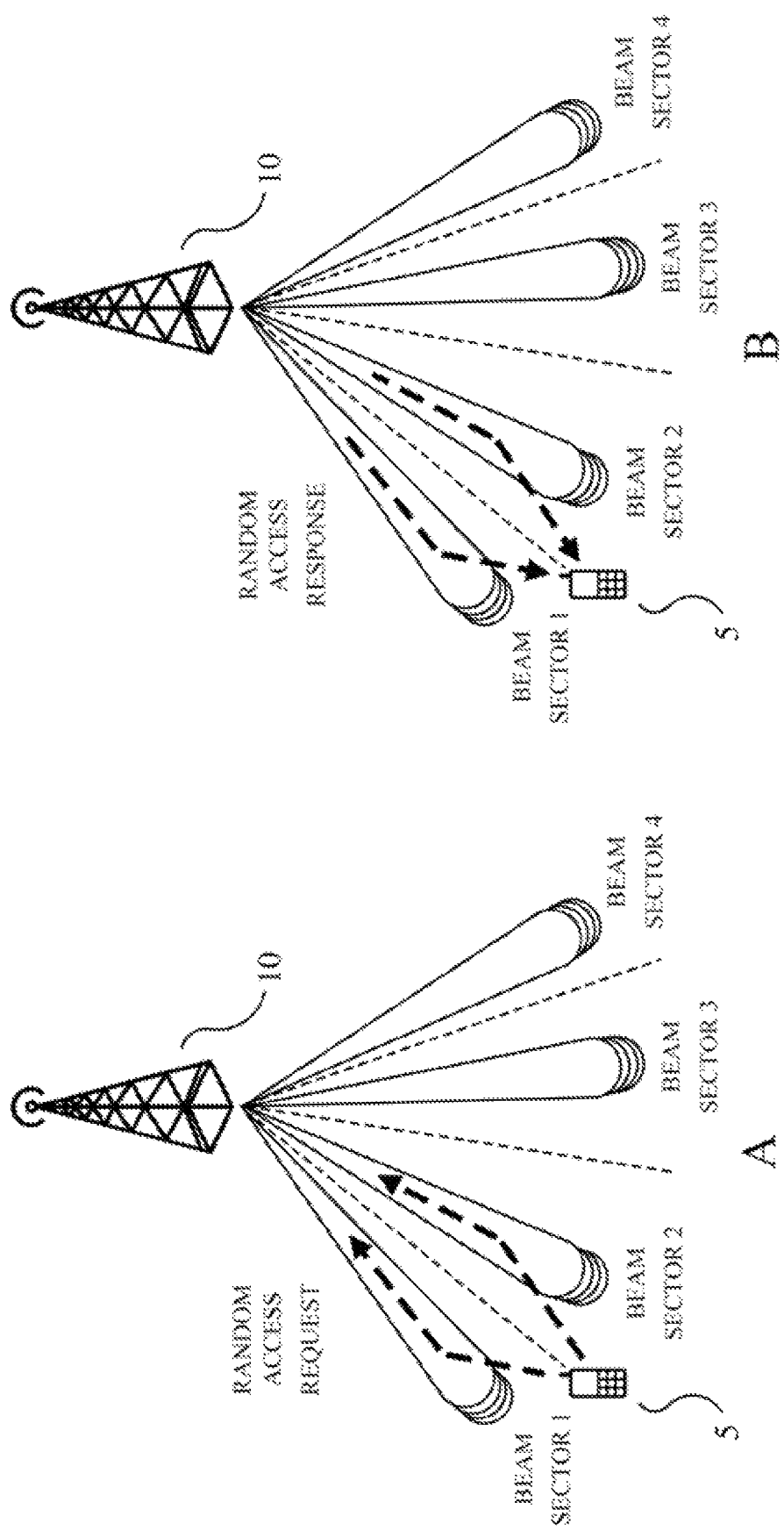
FIG. 5 illustrates an example of a random access process of a terminal positioned at a boundary of a beam sector in a pattern/polarized BDMA system.

FIG. 5 illustrates an example of a random access process of a terminal positioned at a boundary of a beam sector in a pattern/polarized BDMA system. FIG. 5 illustrates an example in which a terminal 5 is positioned between beam sector 1 and beam sector 2 among beam sectors provided by an AP device 10. The terminal 5 is located at a boundary of beam sector 1 or beam sector 2. In this case, the terminal 5 may communicate with the AP device 10 through beam sector 1 and beam sector 2. In FIG. 5A, the terminal 5 requests random access through each of beam sector 1 and beam sector 2. In this case, the AP device 10 individually responds to the random access requests transmitted in different paths. FIG. 5B illustrates an example in which the AP device 10 transmits responses to random access to the terminal 5 through each of beam sector 1 and beam sector 2. Since the random access attempts are received through two beam sectors, the AP device 10 individually proceeds to a subsequent process (a process of allocating timing advance, C-RNTI, and the like) of random access, as shown in FIG. 5B. As a result, the AP device 10 may duplicate unnecessary processes and thereby waste energy and resources.

Figure 6:
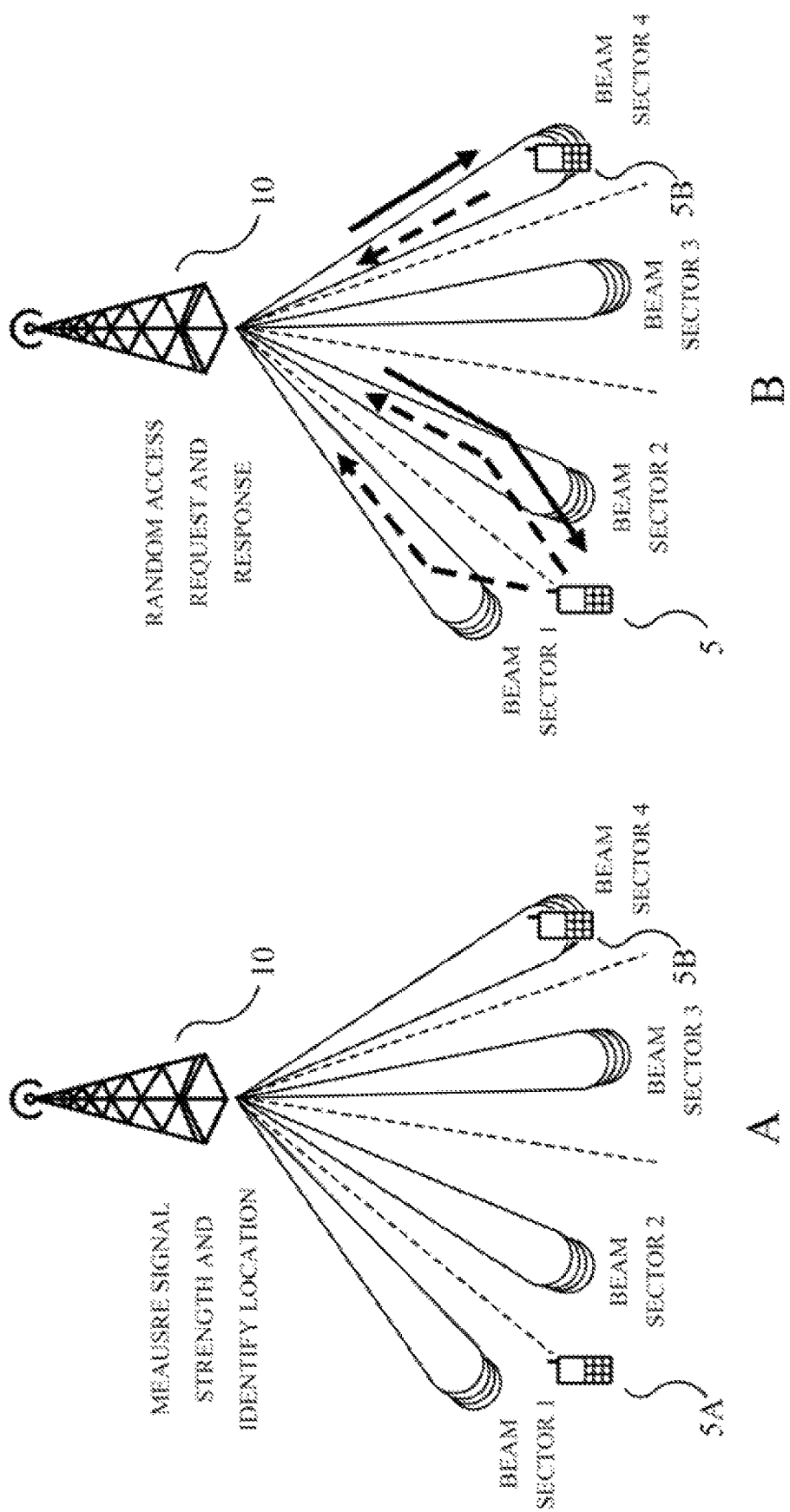
FIG. 6 illustrates another example of a random access process of a terminal in a pattern/polarized BDMA system.

FIG. 6 illustrates another example of a random access process of a terminal in a pattern/polarized BDMA system. In FIG. 6, a terminal 5A is located between beam sector 1 and beam sector 2. It may be seen that the terminal 5A is located in beam sector 1 or at a boundary of beam sector 1. As such, when one terminal is located at a position where the terminal can communicate through a plurality of beam sectors, the terminal is defined as being located in a boundary area. When a terminal is located in a boundary area, it does not mean that the terminal must be located between two beam sectors. When a terminal can receive communicable (meaningful) signals from all of a plurality of beam sectors regardless of a physical distance or a position, the terminal is determined to be located in a boundary area. For example, when the terminal 5A receives signals at a strength greater than or equal to a reference value from a plurality of beam sectors, the terminal 5A is located in a boundary area.

In FIG. 5, a terminal 5B is located in beam sector 4. In this case, the terminal 5B may communicate only through beam sector 4. Although the terminal 5B may receive a signal of another beam sector according to an antenna direction, the terminal 5B generally receives a signal of beam sector 4 most strongly. As such, when one terminal performs communication only through a single beam sector or one beam sector has an advantageous signal strength (channel gain) compared with other beam sectors, the corresponding terminal is defined as being located in a center area. The center area does not necessarily directly relate to a physical location. For example, when the terminal 5B receives one signal whose strength is within a reference range (lower threshold value<signal strength<upper threshold value), the terminal 5B can be seen to be located in a center area. In this case, each of the threshold values may vary according to a system or a communication environment.

FIG. 6A illustrates an example of a process in which terminals 5A and 5B determine preambles to use before requesting random access. The terminal 5 first determines its location information. Here, the location information is information about whether the terminals 5A and 5B are located in a center area or in a boundary area. Although various methods are available, the terminals 5A and 5B may estimate their locations by measuring signal strength of a beam sector that can be received by the terminals 5A and 5B. For example, when the terminal 5A receives signals, each of which has a strength greater than a reference value, from each of beam sector 1 and beam sector 2, the terminal 5A may determine that its location is in a boundary area. In addition, when the terminal 5B receives a signal only from beam sector 4, the terminal 5B may determine that its location is in a center area. The terminals 5A and 5B use preambles that are different from each other in accordance with the location information. In this case, the AP device 10 may confirm the locations of the terminals 5A and 5B on the basis of the types of preambles transmitted by the terminals 5A and 5B.

FIG. 6B illustrates an example of a process of performing random access using a preamble selected by the terminal 5 in FIG. 6A. Two scenarios are possible.

(1) In the first scenario, the terminals 5A and 5B transmit the strength of a signal (amplitude of channel gain) to the AP device 10 (shown as a dotted line). The AP device 10 determines that the terminal 5A is located in a boundary area on the basis of a preamble received from the terminal 5A. When the terminal is located in a boundary area, the AP device 10 may proceed with a random access response and proceed to a subsequent process through one of a plurality of beam sectors used in communication with the corresponding terminal. The AP device 10 may determine that a beam sector whose signal has the strongest strength, among a plurality of beam sectors, as a path for communication with the terminal. In FIG. 6B, the AP device 10 transmits a random access response through beam sector 2 (shown as a solid line). The subsequent random access process is performed only through beam sector 2.

(2) In the second scenario, the terminals 5A and 5B transmit preambles to the AP device 10 (shown as a dotted line). The AP device 10 determines that the terminal 5A is located in a boundary area on the basis of the preamble received from the terminal 5A. The AP device 10 selects only beam sector 2 that has a relatively strong signal compared with received preamble signals and transmits a random access response (shown as a solid line). The subsequent random access process is performed only through beam sector 2.

FIG. 7 illustrates an example of a preamble set. FIG. 7A illustrates an example of one preamble set. FIG. 7A illustrates a preamble set including a total of N preambles. For example, in the case of LTE communication, a preamble set including sixty-four different preambles for each cell is used. An AP device may transmit the preamble set to a terminal in advance. The terminal starts a random access request using an arbitrary preamble in the preamble set. By doing so, it is possible to start random access without collision of a plurality of terminals in one cell (with low probability of collision).

FIG. 7B illustrates an example of a preamble set for selectively transmitting a different preamble in accordance with the location information of the terminal 5 in FIG. 6. FIG. 7B illustrates one preamble set. The preamble set illustrated in FIG. 7B is divided into two sections (areas). The preamble set is divided into a first section (from 1 to M) and a second section (from M+1 to N). For example, as shown in FIG. 7B, the terminal 5A located in the boundary area in FIG. 6 may use the first section. The terminal 5A may select an arbitrary preamble in the first section and transmit the preamble to the AP device 10. In addition, the terminal 5B located in the center area in FIG. 6 may select an arbitrary preamble in the second section and transmit the preamble to the AP device 10. There may be various methods for dividing the preamble set into two sections. Further, the two sections which divide the preamble set may be variable. When the number of terminals located in the center area increases according to the communication environment of a corresponding cell, the section used by the corresponding terminals may be elongated.

FIG. 7C illustrates another example of a preamble set for selectively transmitting a different preamble in accordance with the location information of the terminal 5 in FIG. 6. FIG. 7C illustrates an example of using two preamble sets, unlike in FIG. 7B. For example, the terminal 5A located in the boundary area in FIG. 6 may use a first preamble set. The terminal 5A may select an arbitrary preamble in the first preamble set and transmit the preamble to the AP device 10. In addition, the terminal 5B located in the center area in FIG. 6 may use a second preamble set. The terminal 5B may select an arbitrary preamble in the second preamble set and transmit the preamble to the AP device 10. The first preamble set and the second preamble set may have variable sizes.

Figure 8:
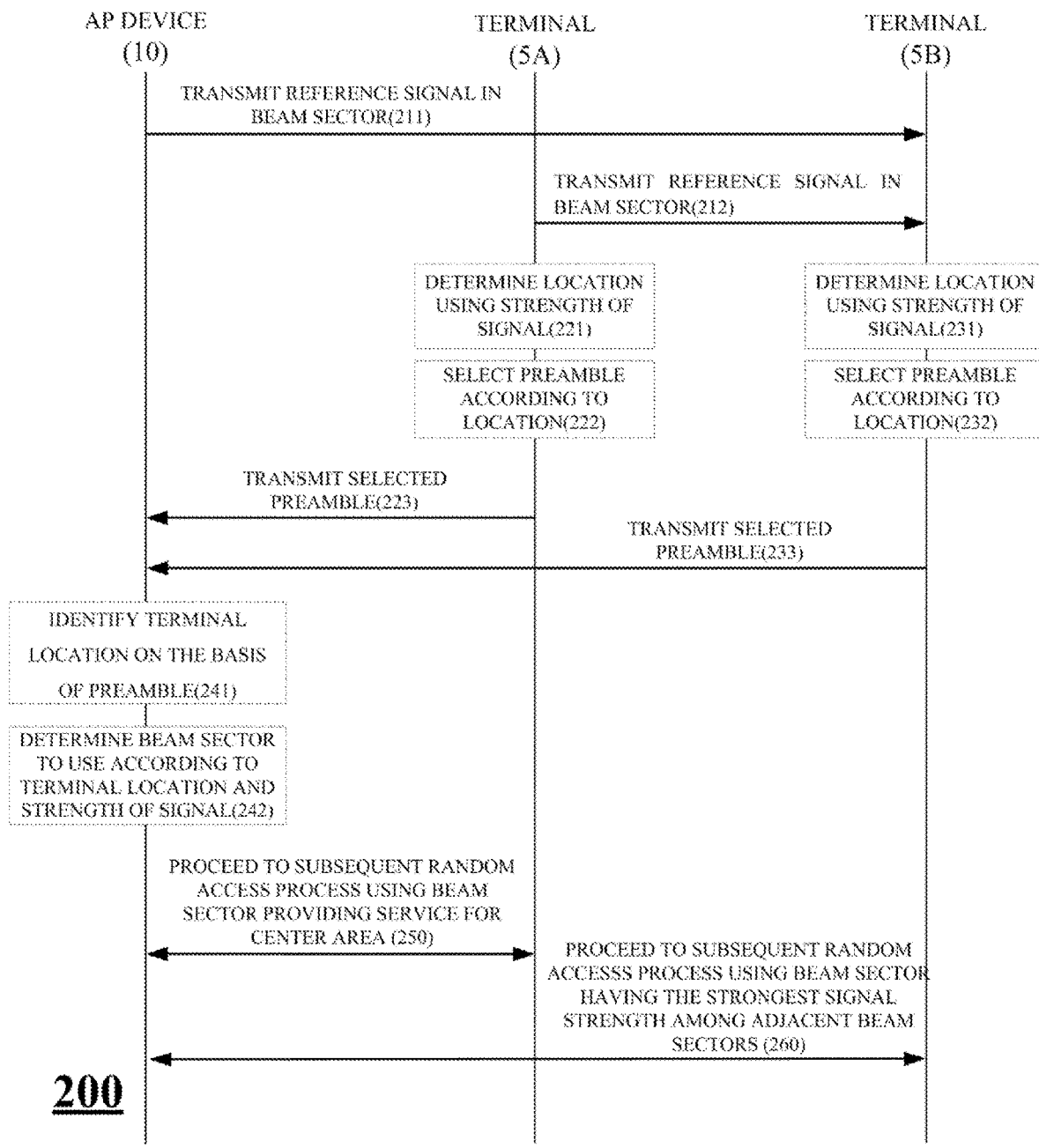
FIG. 8 illustrates an example of a process flowchart of a random access method in a pattern/polarized BDMA system.

FIG. 8 illustrates an example of a process flowchart of a random access method 200 in a pattern/polarized BDMA system. FIG. 8 shows an example of a method of performing a random access in the pattern/polarized BDMA system illustrated in FIG. 6.

The AP device 10 transmits a reference signal to the terminal 5A and the terminal 5B located in the coverage of the AP device 10 through beam sectors (211 and 212). The terminal 5A determines its location on the basis of the strength of a received signal (221). The terminal 5A selects a different preamble according to whether its location is in the center area or in the boundary area (222). The terminal 5A transmits the selected preamble to the AP device 10 (223).

The terminal 5B also determines its location on the basis of the strength of a received signal (231) and selects a different preamble according to whether its location is in the center area or in the boundary area (232). The terminal 5B transmits the selected preamble to the AP device 10 (233).

The AP device 10 identifies locations of the terminals on the basis of the received preambles (241). For example, when the AP device 10 has received a first preamble transmitted from the terminal 5A, the AP device 10 determines that the terminal 5A is located in the boundary area. In addition, when the AP device 10 has received a second preamble transmitted from the terminal 5B, the AP device 10 determines that the terminal 5B is located in the center area.

When the terminal 5B is in the center area, the AP device 10 proceeds to a subsequent random access process using a beam sector (a beam sector for service in the center area) through which the terminal 5B has transmitted the preamble (250).

When the terminal 5A is located in the boundary area, the AP device 10 determines a beam sector to be used in the subsequent random access process on the basis of the strength of a signal (242). Hereinafter, the beam sector to be used in the subsequent random access process will be referred to as a "target beam sector". In this case, the AP device 10 may determine a beam sector which has the strongest signal strength among a plurality of beam sectors as a target beam sector on the basis of the signal strength of the transmitted preamble. Alternatively, the AP device 10 may determine a beam sector which has the strongest signal strength among a plurality of beam sectors as a target beam sector on the basis of the strength of a signal transmitted by the terminal along with the preamble. Then, the AP device 10 and the terminal 5B proceed to the subsequent random access process using the target beam sector (260).

Figure 9:
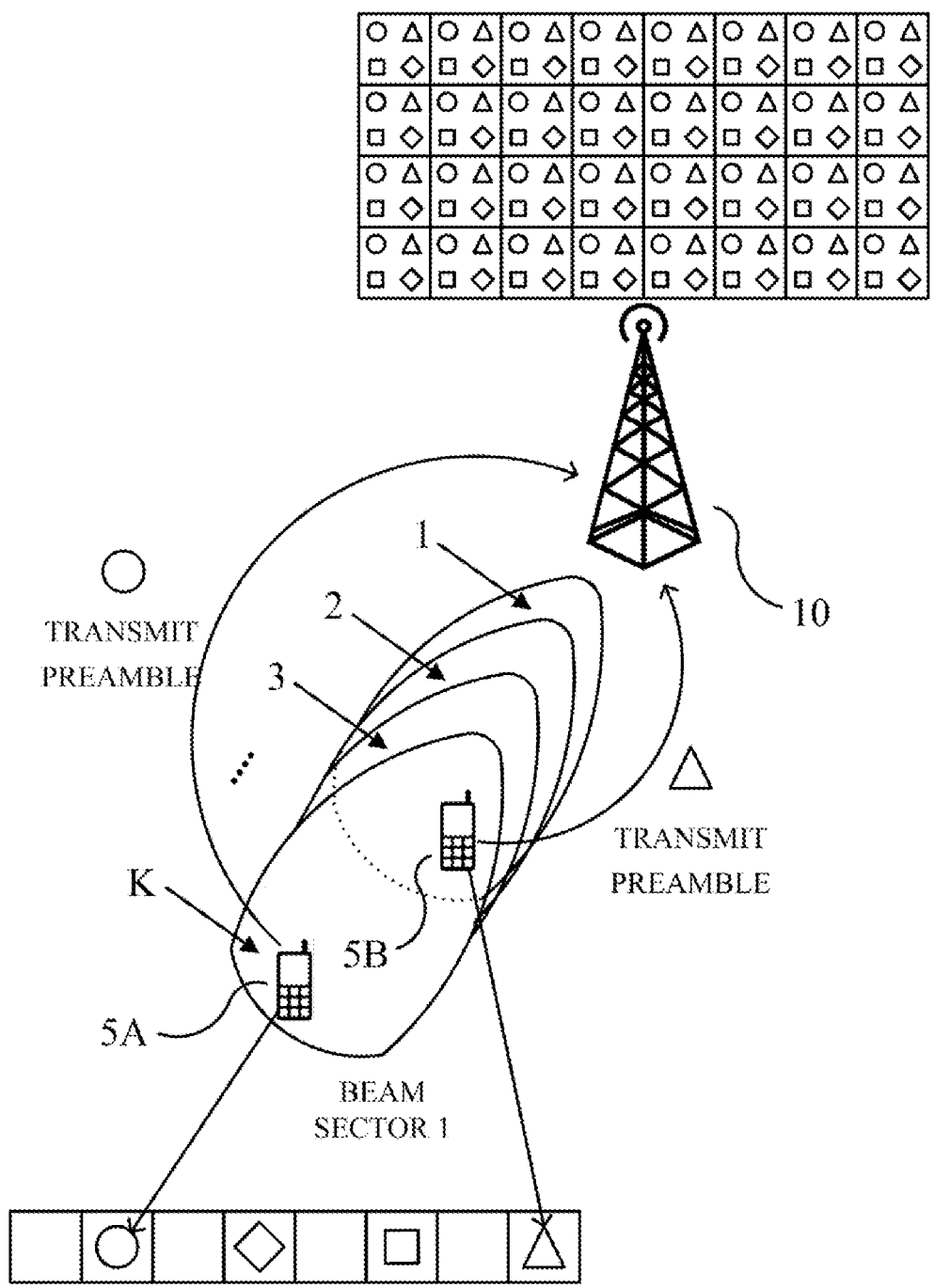
FIG. 9 illustrates another example of a random access process of a terminal in a pattern/polarized BDMA system.

FIG. 9 illustrates another example of a random access process of a terminal in a pattern/polarized BDMA system. The pattern/polarized BDMA system uses a pattern/polarized antenna. The pattern/polarized antenna has a particular pattern/polarization characteristic. As described above, the pattern/polarized antenna has a unique radiation pattern according to the shape and material of the antenna. In addition, the pattern/polarized antenna may have a characteristic that is different according to an antenna array.

FIG. 9 illustrates an example of a random access method using the above-described pattern/polarization characteristic. Even terminals located in the coverage of the same AP device 10 may have a different preferred pattern/polarized antenna array. Being preferred by the terminal may mean that a particular signal among a plurality of signals capable of providing a service to the corresponding terminal has a greater channel gain. FIG. 9 shows an example of using a different preamble according to a pattern/polarized antenna array. By doing so, it is possible to increase the probability that the terminals use different preambles.

FIG. 9 illustrates only one beam sector (beam second 1) on the plane for convenience of explanation. In FIG. 9, the AP device 10 provides signals having radiation patterns different from each other in one beam sector (beam sector 1) using one pattern/polarized antenna. Thus, it may be understood that beam sector 1 has beam sectors divided into a plurality of signals in a vertical direction. In FIG. 9, beam sector 1 has one to K beam sectors in a vertical direction. In FIG. 9, it is assumed that the terminal 5A prefers beam sector K in a vertical direction and the terminal 5B prefers beam sector 1 according to positions of the terminal and the communication environment.

It is assumed that a pattern/polarized antenna or antenna array preferred by the terminal 5A is an antenna indicated as "○". In this case, the terminal 5A may use a preamble allocated to the antenna "○". In a similar way as described in FIG. 7B, one preamble set may be divided according to a type of the pattern/polarized antenna array and the terminal 5A may select an arbitrary preamble from a section allocated to the antenna "○". Further, in a similar way as described in FIG. 7C, a plurality of preamble sets may be provided and the terminal 5A may select an arbitrary preamble from a preamble set allocated to the antenna "○".

It is assumed that a pattern/polarized antenna or antenna array preferred by the terminal 5B is an antenna indicated as "Δ". In this case, the terminal 5B may use a preamble allocated to the antenna "Δ". In a similar way as described in FIG. 7B, one preamble set may be divided according to a type of the pattern/polarized antenna array and the terminal 5B may select an arbitrary preamble from a section allocated to the antenna "Δ". Further, in a similar way as described in FIG. 7C, a plurality of preamble sets may be provided and the terminal 5B may select an arbitrary preamble from a preamble set allocated to the antenna "Δ".

Figure 10:
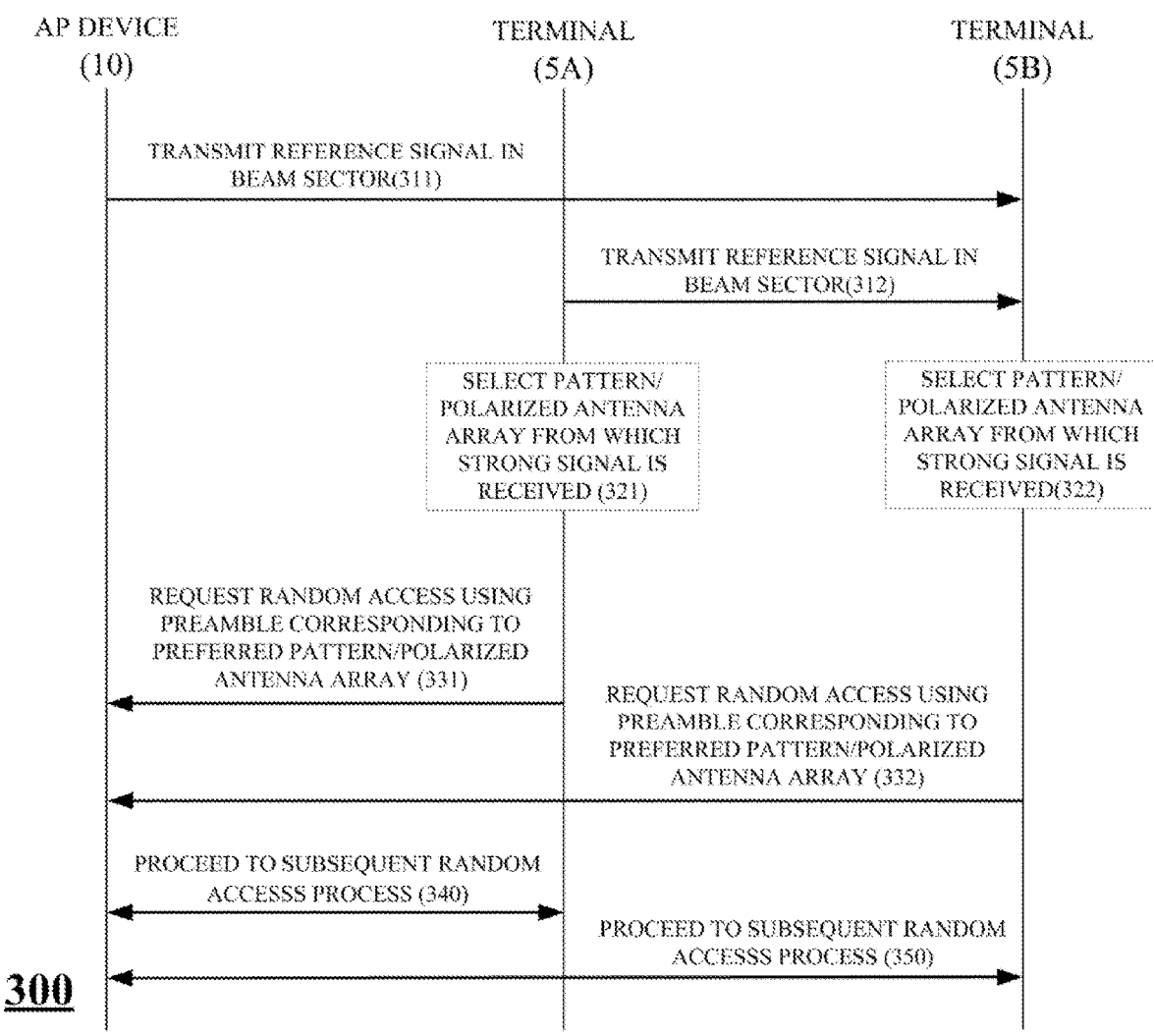
FIG. 10 illustrates another example of a process flowchart of a random access method in a pattern/polarized BDMA system.

FIG. 10 illustrates an example of a process flowchart of a random access method 300 in a pattern/polarized BDMA system. FIG. 10 shows an example of a random access method for the pattern/polarized BDMA system illustrated in FIG. 9.

The AP device 10 transmits a reference signal to the terminal 5A and the terminal 5B, which are located in the coverage of the AP device, through beam sectors (311 and 312). The terminal 5A selects an advantageous pattern/polarized antenna array on the basis of the strength of a received signal (321). The terminal 5A transmits a preamble to the AP device 10 through a beam sector (a path of the signal) provided by the selected pattern/polarized antenna array (331). The terminal 5B also selects an advantageous pattern/polarized antenna array on the basis of the strength of a received signal (322) and transmits a preamble to the AP device 10 through a beam sector (a path of the signal) provided by the selected pattern/polarized antenna array (332). Then, the AP device 10 and the terminals 5A and 5B perform the subsequent random access process (340 and 350).

Meanwhile, the random access method 200 illustrated in FIG. 8 and the random access method 300 illustrated in FIG. 10 may be combined. The criteria for selecting the preamble by the terminals 5A and 5B may be extended to two bases. For example, the terminals 5A and 5B may select a preamble according to two bases, their location information and preferred pattern/polarized antenna array. A process after the terminals select a preamble is the same as shown in FIG. 8 or FIG. 10.

FIG. 11 illustrates an example of selecting a preamble for random access in a pattern/polarized BDMA system. FIG. 11 shows an example of selecting a preamble on the basis of location information of terminals 5A and 5B and pattern/polarized antenna arrays preferred by the terminals 5A and 5B.

FIG. 11A illustrates an example of using one preamble set. The preamble set illustrated in FIG. 11A is largely divided into two sections. The preamble set is divided into a first section (from 1 to M) and a second section (from M+1 to N). The first section and the second section are each divided into a plurality of sub-areas. The terminals 5A and 5B select the first section or the second section in the preamble set on the basis of their location information and select a sub-area in the selected section on the basis of a pattern/polarized antenna array. For example, (1) the terminal 5A, which is located in a boundary area, may select the first section. Assuming that a pattern/polarized antenna array preferred by the terminal 5A is "○," the terminal 5A may select an arbitrary preamble from an area allocated to "○" in the first section. (2) The terminal 5B may select the second section. Assuming that a pattern/polarized antenna array preferred by the terminal 5B is "Δ," the terminal 5B may select an arbitrary preamble from an area allocated to "Δ" in the second section.

FIG. 11A illustrates that the terminals 5A and 5B select the first section or the second section from the preamble set on the basis of their location information (primary selection) and then select a sub-area on the basis of their preferred pattern/polarized antenna array (secondary selection). Unlike in FIG. 11A, the terminals 5A and 5B may select the first section or the second section on the basis of their preferred pattern/polarized antenna array (primary selection) and then select a sub-area on the basis of their location information (secondary selection).

Unlike in FIG. 11A, the sections may be divided into various forms. In addition, the sections may have lengths different from each other. Further, the length of each section may be variously changed.

FIG. 11B illustrates an example of using a plurality of preamble sets. FIG. 11B illustrates two preamble sets and each of the preamble sets is divided into a plurality of sub-areas. The terminals 5A and 5B may select a first preamble set or a second preamble set among the preamble sets on the basis of their location information and select a sub-area from the selected set on the basis of a pattern/polarized antenna array. For example, (1) the terminal 5A, which is located in a boundary area, may select the first preamble set. Assuming that a pattern/polarized antenna array preferred by the terminal 5A is "○," the terminal 5A may select an arbitrary preamble from an area allocated to "○" in the first preamble set. (2) The terminal 5B may select the second preamble set. Assuming that a pattern/polarized antenna array preferred by the terminal 5B is "Δ," the terminal 5B may select an arbitrary preamble from an area allocated to "Δ" in the second preamble set.

FIG. 11B illustrates that the terminals 5A and 5B select the first preamble set or the second preamble set on the basis of their location information (primary selection) and then select a sub-area from the selected preamble set on the basis of their preferred pattern/polarized antenna array (secondary selection). Unlike in FIG. 11B, the terminals 5A and 5B may select the first preamble set or the second preamble set on the basis of their preferred pattern/polarized antenna array (primary selection) and then select a sub-area from the selected preamble set on the basis of their location information (secondary selection).

Unlike in FIG. 11B, the sections may be divided into various forms. In addition, the sections may have lengths different from each other. Further, the length of each section may be variously changed.

It should be noted that the present embodiments and the drawings attached hereto are merely provided to thoroughly disclose a part of technical idea included in the forgoing technology and modifications and specific embodiments which can be easily devised from the description of the above-mentioned embodiments by those skilled in the art to which the following description pertains will fall within the spirit and scope of the invention.

The invention claimed is:

1. A random access method in a beam division multiple access (BDMA) system comprising the steps of:
   receiving, by a terminal, a reference signal of at least one beam sector transmitted from an access point (AP) device;
   estimating, by the terminal, whether the terminal is in a center area of the beam sector provided by the AP device or in a boundary area of the beam sector based on a strength of the reference signal;
   transmitting, by the terminal, a different preamble to the AP device in accordance with location information of whether the terminal is located in the center area or in the boundary area; and
   determining, by the AP device, a target beam sector for transmitting information about uplink resources to be used by the terminal, among a plurality of beam sectors on the basis of the received preamble,
   wherein when the terminal estimates that the terminal is in the center area, the terminal transmits a preamble in a first preamble set to the AP device and when the terminal estimates that the terminal is in the boundary area, the terminal transmits a preamble in a second preamble set to the AP device.

2. The random access method of claim 1, wherein the first preamble set includes a plurality of preambles in a first area in a preamble set, and the second preamble set includes a plurality of preambles in a second area in the preamble set.

3. The random access method of claim 1, further comprising transmitting, by the AP device, a preamble set including a plurality of preambles to the terminal in advance.

4. The random access method of claim 1, wherein the determining of the target beam sector comprises determining a beam sector whose reference signal is strongest among reference signals of beam sectors as the target beam sector.

5. The random access method of claim 1, wherein the determining of the target beam sector comprises determining, by the AP device, a beam sector which provides a communication service to the center area as the target beam sector when the received preamble is one of preambles for the center area.

6. The random access method of claim 1, wherein the determining of the target beam sector comprises determining, by the AP device, a beam sector whose signal is strongest among a plurality of beam sectors providing a communication service to the boundary area as the target beam sector when the received preamble is one of preambles for the boundary area.

7. The random access method of claim 1, wherein when the terminal receives a plurality of reference signals, the terminal measures a signal strength of each of the plurality of reference signals and when there is a signal that exceeds a reference value, among the measured signal strengths of the plurality of reference signals, or when only one reference signal is received, it is determined that the terminal is in the center area.

8. The random access method of claim 1, wherein when the terminal receives a plurality of reference signals, the terminal measures a signal strength of each of the plurality of reference signals and when signal strengths of two or more reference signals among the measured signal strengths of the plurality of reference signals fall within a reference range, it is determined that the terminal is in the boundary area.

9. A random access method in a pattern/polarized beam division multiple access (BDMA) system comprising the steps of:

receiving, by a terminal, a reference signal of at least one beam sector transmitted from an access point (AP) device which uses a pattern/polarized antenna;

determining, by the terminal, an antenna array whose signal is strongest among a plurality of pattern/polarized antenna arrays providing the beam sector;

transmitting, by the terminal, a preamble which corresponds to a type of the antenna array having the strongest signal to the AP device; and estimating, by the AP device, a delay time of uplink on the basis of the preamble and transmitting information for compensating for the delay time to the terminal, wherein the preamble has a different value according to a type of the antenna array.

10. The random access method of claim 9, wherein the terminal is provided with preamble sets which are different from each other in accordance with a type of the antenna array and transmits a preamble in the preamble set dedicated to the type of the antenna array.

11. The random access method of claim 9, wherein the terminal transmits a preamble in an area of a preamble set including a plurality of preambles to the AP device, wherein the area is differently specified according to the type of the antenna array.

12. A random access method in a pattern/polarized beam division multiple access (BDMA) system comprising the steps of:

receiving, by a terminal, a reference signal of at least one beam sector transmitted from an access point (AP) device which uses a pattern/polarized antenna;

estimating, by the terminal, whether the terminal is in a center area of the beam sector provided by the AP device or in the boundary area of the beam sector by using a strength of the reference signal; and transmitting, by the terminal, a preamble selected on the basis of at least one of location information of whether the terminal is located in the center area or the boundary area and a type of an antenna array having the strongest signal among a plurality of pattern/polarized antenna arrays providing the beam sector to the AP device.

13. The random access method of claim 12, wherein when the terminal estimates that the terminal is in the center area, the terminal transmits at least one preamble, corresponding to the type of the antenna array, in a first preamble set to the AP device and when the terminal estimates that the terminal is in the boundary area, the terminal transmits at least one preamble, corresponding to the type of the antenna array, in a second preamble set to the AP device.

14. The random access method of claim 12, wherein the terminal is provided with preamble sets which are different from each other according to a type of the antenna array, each of the preamble sets is divided into different areas according to the location information, the terminal selects the preamble set dedicated to the type of the antenna array and transmits one of preambles dedicated in the preamble set according to the location information to the AP device.

15. The random access method of claim 12, wherein the terminal is provided with a preamble set including a plurality of preambles, determines a first area in the preamble set that is specified according to the location information, and transmits one of preambles dedicated in the first area according to the type of the antenna array to the AP device.

16. The random access method of claim 12, wherein the terminal is provided with a preamble set including a plurality of preambles, determines a first area in the preamble set that is specified according to the type of the antenna array and transmits one of preambles dedicated in the first area according to the location information to the AP device.

* * * * *